June 22, 1948.  A. B. WHITE  2,443,671
ARC WELDING SYSTEM
Filed Dec. 3, 1942
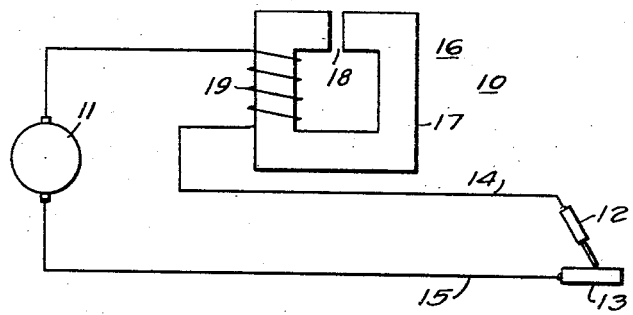
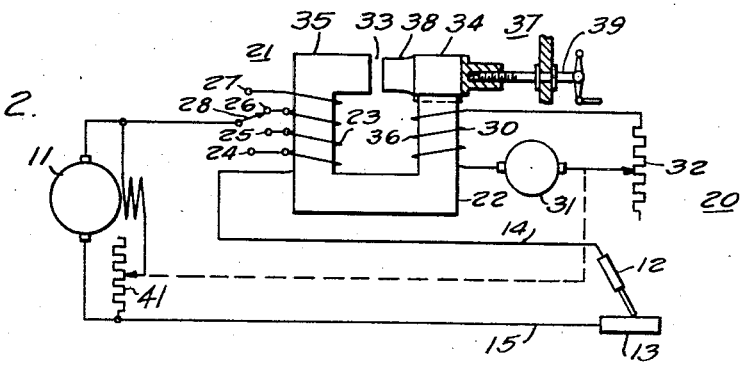
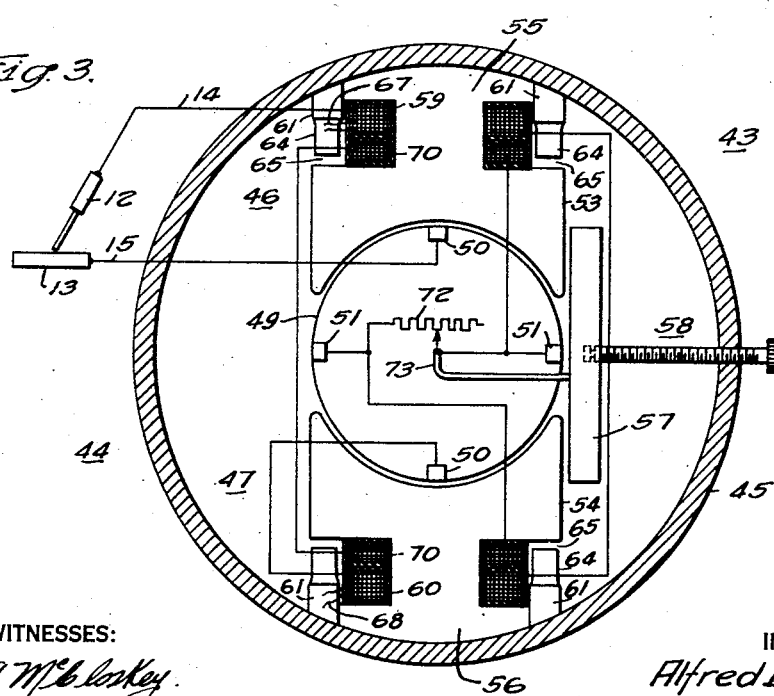
WITNESSES:
INVENTOR
Alfred B. White.
ATTORNEY Patented June 22, 1948

2,443,671

UNITED STATES PATENT OFFICE 2,443,671

ARC WELDING SYSTEM

Alfred B. White, Murrysville, Pa., assignor to Westinghouse Electric Corporation, East Pittsburgh, Pa., a corporation of Pennsylvania Application December 3, 1942, Serial No. 467,720

1 Claim. (Cl. 315—289)

My invention relates generally to welding and it has reference, in particular, to arc welding systems.

Generally stated, it is an object of my invention to provide for improving the welding characteristics of direct current arc welding systems in a manner which is both single and effective.

More specifically, it is an object of my invention to provide for utilizing a normally saturated magnetic circuit principally for limiting the transient currents in arc welding systems at the extreme lower range of normal welding current values without effecting transient conditions within the normal range of welding current values.

It is also an object of my invention to provide for coupling with a direct current arc welding circuit adjusted for a normal value of welding current a magnetic circuit which is saturated at the normal value of welding current and operates to supply energy to the welding circuit during current fluctuations outside of the normal range of welding current values for a given normal value of current.

Another object of my invention is to provide for rendering the saturation point of a saturable magnetic circuit in an arc welding system more sharply defined so that the magnetic circuit is effective to prevent transient fluctuations whenever the welding current reaches a predetermined minimum value.

A further object of my invention is to provide for making the welding circuit of an arc welding generator highly reactive only at predeterminedly definite values of welding current below the normal range of welding current values for any given output setting of the generator.

Yet another object of my invention is to provide for preventing undershoot of the welding current in an arc welding system below predetermined values of welding current without preventing overshoot of the welding current.

Still another object of my invention is to provide for adjusting the saturation point of a saturable reactor in a direct current arc welding system so as to prevent more than a predetermined amount of current undershoot at different values of welding current and control the current overshoot.

Other objects will, in part, be obvious and will, in part, be explained hereinafter.

In practicing one embodiment of my invention, a direct current arc welding system may be provided with a saturable reactor having a magnetic core with an air gap therein and a winding thereon connected in the welding circuit. The reactor may be designed to saturate before welding current reaches the normal value for which the system is adjusted, so that the reactor is substantially ineffective throughout the normal range of welding currents usually encountered for such an adjustment and is effective only when the current owing to a transient fluctuation tends to reach a value outside a predetermined range of welding currents. Variation of the saturation point may be effected by providing a variable air gap in the magnetic circuit changing the coupling between the welding circuit and the magnetic circuit, or by providing a direct current control winding on the core which may be connected to a unidirectional source of control current to either buck or boost the main reactor winding.

For a complete understanding of the nature and scope of my invention, reference may be made to the following detailed description which may be studied in connection with the accompanying drawing, in which:

Figure 1 is a diagrammatic view of a welding circuit embodying the features of the invention;

Fig. 2 is a diagrammatic view of a welding circuit embodying a modification of the invention; and Fig. 3 is a diagrammatic cross sectional view partly in section of a welding generator embodying the principal features of the invention.

Referring to Figure 1, the reference numeral 10 may denote generally an arc welding system including a direct current generator 11 which may be connected to an arc welding electrode 12 and work 13 by means of conductors 14 and 15, respectively.

In order to prevent transient reductions or undershoots of the welding current from the normal value for which the generator is adjusted, impedance means, such as the saturable reactor 16, may be provided. The reactor may, for example, comprise a substantially rectangular magnetic core 17 having an air gap 18 in one leg thereof. A suitable winding 19 may be positioned about one leg of the reactor core and connected in series circuit relation with the generator 11, electrode 12, and work 13.

In order to secure the desired characteristics, I propose to design the reactor 16 so that the core 17 thereof is substantially saturated throughout the normal range of welding current values encountered for a given adjustment of the generator. The reactor 16 is thus substantially ineffective to prevent fluctuations of the welding current within the normal acceptable range of values thereof or about the normal range for a given adjustment. However, when the welding current momentarily dips to a value below the normal acceptable range, the magnetic core 17 becomes unsaturated and the inductive reactance of the winding 19 increases greatly. The reactor thus operates to prevent dips or undershoot of the welding current below the normal range of welding current values. By thus preventing undershoots which tend to extinguish the arc, and permitting current transients within and above the normal range of welding current values, stabilization of the arc is greatly improved, so that the arc may be more easily maintained when welding under adverse conditions.

In Fig. 2, the reference numeral 20 may denote generally an arc welding system wherein a direct current generator 11 may be connected to an arc welding electrode 12 and work 13 by conductors 14 and 15, respectively. A saturable reactor 21 may be provided for controlling the welding current fluctuations, having a magnetic core member 22 with a reactor winding 23 thereon connected in series circuit relation with the generator 11, electrode 12 and work 13.

In order to provide for varying the saturation point of the core member 22, so that the reactor may be made to function satisfactorily at different values of welding current provided by the generator 11, suitable adjusting means may be provided. For example, the reactor winding 23 may be provided with a plurality of taps 24, 25, 26 and 27 and means, such as the movable contact arm 28, for connecting different portions of the winding in the welding circuit so as to vary the saturating effect of the welding current on the core 22 and permit saturation to be effected at substantially the same percentage of normal welding current for different values of normal welding current.

Instead of varying the connections of the reactor winding 23 to the welding circuit, means such as the control winding 30 may be provided for varying the saturation point of the core member 22. The winding 30 may be connected to a suitable source of unidirectional current, as the auxiliary generator 31, and a control resistor 32, or other suitable means, may be provided for varying the excitation current supplied to the control winding 30.

By supplying different predetermined amounts of control current to the control winding, the saturating effect of the welding current in the reactor winding 23 may be readily varied so as to secure saturation of different values of welding current. Thus, saturation may, for example, be effected at 30% of the nominal rating, or some other percentage, for any of a number of different normal values.

In addition to merely varying the saturation point to prevent current undershoot below the normal range of welding current values, the energization of the control winding 30 may be so varied as to oppose the magnetizing effect of the reactor winding 23, so that the core member 22 does not saturate until much higher values of welding current are reached than would be otherwise possible. Saturation may thus be prevented until the welding current reaches a value above the normal range, so that the amount of overshoot may be controlled, only portions of the higher peak overshoots being permitted. The undershoots are blocked as before. Since the saturating point must be adjusted in such event, to keep it in step with the actual normal value of the welding current, means may be provided for controlling the generator output and the saturating point of the reactor in unison. For example, the output controlling means of the generator 11, such as the field rheostat 41, may be operatively connected to the control resistor 32 so that both may be adjusted simultaneously. When the generator output is increased, the current in the control winding may be reduced to effect saturation at a given percentage of the normal welding current.

The excitation may even be increased sufficiently that the core is normally saturated until the welding current reaches a peak value above the normal range of welding current values whereupon the reactor becomes unsaturated and effective to prevent such transient currents. By using reverse excitation of the control winding much wider ranges of flux change may be effected and more efficient use of a given volume of iron in the core member may be obtained.

The saturation point of the magnetic core member 22 may also be varied by changing the air gap 33 thereof. This may be done in any suitable manner such as, for example, by making the portion 34 of the core member on one side of the air gap adjustable relative to the portion 35 on the other side of the air gap. The portion 34 of the core member may be slidably positioned on the adjacent core portion 36 and provided with adjusting means 37 comprising a rotatable threaded shaft member 39 for moving the core member 34 relative to the opposite core portion 35. Saturation may be produced by one, or by any combination, of the above methods.

In order to produce saturation of the core member 22 at a definite predetermined value of welding current instead of having the core saturate gradually, as is the normal case, the core member may be provided with a section of a magnetic material having a saturation curve with a relatively sharp bend therein instead of the usual relatively gradual or uniform slope. For example, the core portion 34 may be provided with a reduced tip portion 38 of a 40–60 percent nickel-steel alloy, or some other suitable magnetic material having a saturation curve with a relatively sharp knee or bend therein. When saturation of this tip section occurs the air gap 33 is effectively increased relatively abruptly, resulting in a sharply defined saturation point for the entire magnetic circuit.

Referring to Fig. 3, the reference numeral 43 denotes generally an arc welding system wherein a welding electrode 12 and work 13 may be connected to a source of direct current such as the generator 44 by means of conductors 14 and 15, respectively.

The generator 44 may be of any suitable type comprising, for example, a generator of the cross field type having a frame 45 with oppositely positioned field pole members 46 and 47 secured therein. An armature 49 may be rotatably positioned between the field pole members and provided with main and auxiliary brushes 50 and 51, respectively, which may be positioned along axes at right angles to each other. The field pole members 46 and 47 may comprise generally arcuate shoe portions 53 and 54 positioned adjacent the armature, and body portions 55 and 56, respectively connecting the shoe portions to the frame. Means, such as the magnetic shunt member 57, may be adjustably positioned adjacent the shoe portions on one side of the field pole members and provided with suitable adjusting means 58 to provide for varying the distance between the shunt member and the shoe portions to change the magnetic leakage flux therebetween and vary the output of the generator. The field pole members may also be provided with suitable field windings such as the series field windings 59 and 60 which may be connected in series circuit relation with the main brushes 51 and the electrode 12 and work 13.

Either one or both of the field pole members 46 and 47 may be provided with magnetic shunt means such as the auxiliary field pole members 61 to provide a magnetic circuit for a leakage flux substantially enclosing the series field windings 59 and 60. In order to secure the desired operating characteristics in the generator 44 similar to those hereinbefore described in connection with the welding systems of Fig. 1 and Fig. 2, it is proposed to make the magnetic path for the leakage flux saturate when the welding current reaches a value no greater than the minimum current within the normal acceptable range of welding current values for a given output adjustment. This effect may be secured by designing the auxiliary pole members 61 so that they saturate when the welding current reaches the desired minimum value. A sharply defined saturating point may be produced by providing the auxiliary pole members with tip portions 64 adjacent the air gaps 65 which comprise a 40–60 percent nickel-steel alloy, or any other suitable magnetic material having a sharply defined saturating point.

If desired only one of the field pole members may be provided with means such as the auxiliary pole members 60. The body portion of the field pole member having the auxiliary pole members is preferably of sufficiently large section to prevent saturation under normal current values for all current adjustments. If both field pole members are provided with auxiliary pole members, then a portion of the magnetic circuit, such as the frame 42 should be of sufficiently reduced section to saturate for a value of welding current below the normal range.

Control of the saturating point of the leakage flux path may be effected in any of the several manners described hereinbefore in connection with the saturable reactor 21 of Fig. 2. For example, the series field windings 59 and 60 may be provided with suitable taps 67 and 68 whereby different portions of the windings may be connected in the welding circuit to effect saturation of the leakage path for different values of welding current.

If desired, means such as the control winding 70 may be provided upon either one or both of the field pole members for controlling the saturating point of the leakage flux path. The control winding 70 may be connected to any suitable source of unidirectional or direct current, being, for example, connected in series circuit relation with the auxiliary brushes 51. This method has a particular advantage in that a decrease in current in the series field windings 59 and 60 below the saturation value demands an increase in current in the control winding 70, that is, in the short circuit brush circuit. An increase in current in the auxiliary or short circuit brush circuit increases the excitation of the generator and provides further insurance against extreme current dip or undershoot. Means such as the control resistor 72 may be provided in shunt with the control windings to control the current in the control windings and also reduce the effective resistance of the auxiliary brush circuit, thereby producing a steeper volt-ampere curve for the generator. The reactance of the series windings is thereby increased for any given value of welding current below the saturation point.

As a further method of varying the saturating point of the leakage flux path, the air gaps 65 between the auxiliary pole members 61 and the shoe portions of the field pole members 46 and 47 may be made adjustable. Such adjustment may be effected in any suitable manner such as shown in connection with the saturable reactor of Fig. 2. If desired, the contact member 73 of the control resistor may be operatively connected to the shunt member 57, so that the saturation point of the leakage flux path may be varied in accordance with the output of the generator, similar to the arrangement described in connection with Fig. 2.

From the above description and the accompanying drawing, it will be apparent that I have provided in a simple and effective manner for controlling the transient arc current variations below the normal range of welding current without interfering with the transient variations within the normal range of values. In particular, the prevention of current dips or undershoots below the normal value of welding current without preventing reasonable current increases within the normal range of welding current values, is of great advantage in stabilizing the welding arc. Control of the saturating point at which the different reactive means become ineffective is readily and inexpensively effected, and the point of saturation may be made to occur either below or just above the operating range.

Since certain changes may be made in the apparatus covered in the above description, and different embodiments of the invention may be made without departing from the spirit or scope thereof, it is intended that all the matter contained in the above description or shown in the accompanying drawing shall be considered as illustrative and not in a limiting sense.

I claim as my invention:

An arc welding system comprising, an arc welding circuit including an electrode and work upon which a welding operation is to be performed connected to a source of direct current having output control means, and a saturable reactor having a magnetic core with an air gap therein and a winding thereon connected in series relation with the welding circuit for saturating the core when the welding current reaches a value which is less than the value of welding current for which the output control is adjusted, and means for varying the saturation point of the core to effect saturation at different normal values of welding current, said means being operatively connected to the output control means of the source for variation in accordance with the output of the source.

ALFRED B. WHITE.

(References on following page)

REFERENCES CITED

The following references are of record in the file of this patent:

UNITED STATES PATENTS

| Number | Name | Date |
|---|---|---|
| 787,738 | Eastwood | Apr. 18, 1905 |
| 1,146,988 | Arendt | July 20, 1915 |
| 1,238,406 | Homrighaus | Aug. 28, 1917 |
| 1,353,711 | Bergman (1) | Sept. 21, 1920 |
| 1,485,744 | Tubayne | Mar. 4, 1924 |
| 1,539,044 | Frickey | May 26, 1925 |
| 1,699,506 | Faus | Jan. 15, 1929 |
| 1,709,629 | Peters | Apr. 16, 1929 |
| 1,893,354 | Bergman (2) | Jan. 3, 1933 |
| 1,922,760 | Dreese | Aug. 15, 1933 |
| 1,961,197 | Churchward | June 5, 1934 |
| 1,962,691 | Landis | June 12, 1934 |
| 1,994,953 | Klinkhamer | Mar. 19, 1935 |
| 2,058,339 | Metzger | Oct. 20, 1936 |
| 2,071,839 | Kauders | Feb. 23, 1937 |
| 2,080,388 | Langkan | May 11, 1937 |
| 2,121,592 | Gough | June 21, 1938 |
| 2,157,769 | Longoria | May 9, 1939 |
| 2,227,678 | Stiles | Jan. 7, 1941 |
| 2,300,867 | Blankenbuehler | Nov. 3, 1942 |
| 2,308,279 | Goss | Jan. 12, 1934 |